United States Patent Office 3,135,740
Patented June 2, 1964

3,135,740
TETRAALKYL ESTERS OF 6-DIALKYLAMINO-5,5-DIALKYLCYCLOHEXANE - 1,1,3,3 - TETRACARBOXYLIC ACIDS AND THE PROCESS FOR THEIR PREPARATION
Kent C. Brannock and Robert D. Burpitt, Kingsport, Tenn., assignors to Eastman Kodak Company, Rochester, N.Y., a corporation of New Jersey
No Drawing. Filed Oct. 31, 1961, Ser. No. 148,825
7 Claims. (Cl. 260—239)

This invention relates to substituted cyclohexane tetracarboxylate compounds and to methods for making them. More particularly, the invention relates to reaction of a dialkyl methylene malonate with a tertairy enamine to produce new substituted cyclohexane tetracarboxylate compounds.

An object of the invention is to provide novel compositions of matter and methods for making them. Another object is to provide new compounds useful as plasticizers for modifying the physical properties of synthetic resin compositions.

We have discovered that dialkyl methylene malonate having the general formula

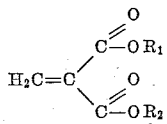

wherein each of $R_1$ and $R_2$ represents an aliphatic group, saturated or unsaturated, preferably containing from 1 to 4 carbon atoms,
will react with a tertiary enamine having the general formula

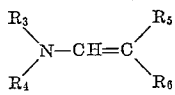

wherein $R_3$ and $R_4$ represent two alkyl groups, preferably each containing from 1 to 6 carbon atoms, or together $R_3$ and $R_4$ with the adjacent N to which they are attached complete a heterocyclic radical that preferably contains from 4 to 5 carbon members in the ring,
and $R_5$ and $R_6$ represent either (1) two alkyl groups or (2) an alkyl group and an aryl group or (3) an alkyl group and a hydrogen atom, or (4) members that together with the C to which $R_4$ and $R_5$ are attached complete a carbocyclic radical containing 4–8 carbon members in the ring.

Two moles of the dialkyl methylene malonate will react with 1 mole of the enamine when the reactants are mixed to produce a substituted cyclohexane compound having the general formula

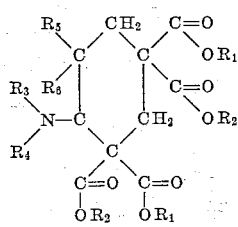

Substituted cyclohexane compounds having the formula shown above are useful as plasticizers for modifying the hardness, tensile strength, and rigidity of polyvinyl resins. Polyvinyl resin compositions containing these plasticizers may be used for molding articles in which hardness, strength and rigidity of the resin are desired properties.

Following are examples illustrating the invention by reference to preferred embodiments.

Example 1

Diethyl methylene malonate (96 g., 0.56 mole) and N,N-dimethyl isobutenyl amine (30 g., 0.3 mole) were mixed in a reaction flask. An exothermic reaction took place with the temperature rising to 110° C. within 15 minutes. After the reaction had subsided, the mixture was heated to 160–170° C. and held there for 15 minutes. Distillation of the reaction mixture in vacuum gave 101 g. (81.5% yield) of tetraethyl-6-dimethylamino-5,5-dimethyl-cyclohexane-1,1,3,3-tetracarboxylate, boiling point 170–173° at 1 mm., $n_D^{20}$ 1.4696. Because of steric hindrance to the ester groups and the dimethylamino group in this compound, it was not possible to saponify it or to quaternize the dimethylamino group with methyl p-toluene sulfonate under the usual reaction conditions.

Example 2

The compound produced in Example 1 was mixed into polyvinyl chloride resin (Geon 101) using 50 parts by weight of the compound to 100 parts by weight of resin. The mixture produced a rigid plastic material which was extremely hard and which had the following properties:

| | |
|---|---|
| Tensile strength _____ p.s.i__ | 2400 |
| Ultimate elongation _____ | 0 |
| Soapy water extraction _____ | 0.2 |
| Soapy water absorption _____ | +0.3 |
| Heptane extraction _____ | +1.4 |
| Activated carbon loss, 17 mills _____ percent__ | 0.7 |

Example 3

Diethyl methylene malonate (0.86 g., 0.5 mole) was added portionwise to N-isobutenyl 3-azabicyclo-[3.2.2]-nonane (45 g., 0.25 mole). The temperature of the reaction mixture rose to 90° and was maintained at a temperature of 80–90° C. by rate of addition. When no further heat was evolved, the mixture was heated at 152–160° C. for 1½ hours. The reaction mixture was then heated to 200° C. and fractionated in a 6-inch Vigreux distillation column at a pressure of 0.8 mm. The residue, 50 g. (38% yield), crystallized on cooling. A sample recrystallized from ethanol melted at 111–112° C. and analysis indicated the structure to be tetraethyl-6-(3-azabicyclo[3.2.2]non-3-yl) - 5,5-dimethyl-1,1,3,3-cyclohexane tetracarboxylate.

Example 4

By the process of Example 3, diethyl methylene malonate and N-(2-ethyl-1-butenyl)piperidine were reacted to produce a 47% yield of tetraethyl-6-piperidino-5,5-diethyl-1,1,3,3-cyclohexane tetracarboxylate, melting point 60–63° C.

Example 5

By the process of Example 3, diethyl methylene malonate and N-isobutenylmorpholine were reacted to produce a 33% yield of tetraethyl-6-morpholino-5,5-dimethyl-1,1,3,3-cyclohexane tetracarboxylate, melting point 77–78° C.

Example 6

Diethyl methylene malonate (64 g., 0.37 mole) was added portionwise to N,N-dimethyl-1-butenyl-amine at such a rate as to keep the reaction temperature at 80–90° C. The reaction mixture was then allowed to stand at room temperature for 15 hours. Distillation through a 4-inch Vigreux column gave, after removal of lower boilers, 32 g. (64% yield) of tetraethyl-6-dimethylamino-5-ethyl - cyclohexane-1,1,3,3-tetracarboxylate, boiling point 165–170° at 0.8 mm., $n_D^{20}$ 1.4640.

Examples of enamine compounds that can be employed according to the invention as starting materials in the reaction with a dialkyl methylene malonate to produce the substituted cyclohexane tetracarboxylate compounds of the invention are those enamines prepared from any combination of the following secondary amines and aldehydes:

Amines:
Dimethylamine
Diethylamine
Dipropylamine
Dibutylamine
Diallylamine
Ethyl methylamine
Allyl methylamine
Pyrrolidine
Piperidine
Morpholine
3-azabicyclo[3.2.2]nonane Aldehydes:
Propionaldehyde
Butyraldehyde
Isobutyraldehyde
2-ethylbutyraldehyde
n-Hexanal
2-ethylhexanal
Phenylacetaldehyde
Cyclopentane carboxaldehyde
Cyclohexane carboxaldehyde
β-Dimethylaminopropionaldehyde Examples of typical alkyl esters of methylene malonic acid that may be employed according to the invention as starting materials in the reaction with enamines to produce substituted cyclohexane tetracarboxylate compounds having the above general formula are:

Dimethyl methylenemalonate
Diethyl methylenemalonate
Dipropyl methylenemalonate
Diisopropyl methylenemalonate
Dibutyl methylenemalonate
Diisobutyl methylenemalonate
Diamyl methylenemalonate
Di-2-ethylhexyl methylenemalonate
Ethylmethyl methylenemalonate
Methylpropyl methylenemalonate Because of steric hindrance in the substituted cyclohexane molecule, the compounds of the invention are particularly useful as plasticizers in vinyl resins for use in applications where good resistance to quaternizing and hydrolyzing agents is needed. These plasticizers have good hydrolytic stability even in boiling water.

The addition reaction is exothermic and will proceed with evolution of heat when the reactants are mixed together. The same product is obtained regardless of the ratio of reactants in the mixture; even with a molal excess of enamine in the mixture the reactants combine in a ratio of 2 moles malonate to 1 mole enamine, to produce the substituted cyclohexane tetracarboxylate.

As the reaction proceeds, it is advisable to control the temperature by gradual addition of one ingredient to prevent raising the temperature to the boiling point of the mixture. The reactions in the examples were carried out at temperatures between room temperature and the boiling point of the mixture but lower temperatures could be used if desired. The reactions were carried out at atmospheric pressure but higher or lower pressures could be employed if desired.

The invention has been described with reference to certain preferred embodiments, it being understood that variations and modifications can be made within the scope of the invention defined in the following claims.

We claim:
1. Tetraethyl 6-(3-azabicyclo[3.2.2]non-3-yl) - 5,5 - dimethyl-1,1,3,3-cyclohexanetetracarboxylate.
2. Tetraethyl 6-piperidino-5,5 - diethyl - 1,1,3,3 - cyclohexanetetracarboxylate.
3. Tetraethyl 6-morpholino-5,5-dimethyl-,1,1,3,3-cyclohexanetetracarboxylate.
4. Tetraethyl 6-dimethylamino-5 - ethyl - cyclohexane-1,1,3,3-tetracarboxylate.
5. Tetraethyl 6-dimethylamino-5,5-dimethyl - cyclohexane-1,1,3,3-tetracarboxylate.
6. A method of synthesizing a substituted cyclohexane tetracarboxylate ester which comprises reacting two moles of dialkyl methylene malonate having the formula

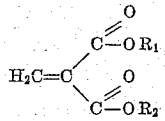

wherein each of $R_1$ and $R_2$ represents lower alkyl, with one mole of an enamine having the formula

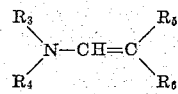

wherein each of $R_3$ and $R_4$ represents a member selected from the group consisting of lower alkyl, lower alkenyl, and members of a ring wherein $R_3$ and $R_4$ together with the nitrogen form a heterocyclic ring having four to eight carbon atoms, and each of $R_5$ and $R_6$ represents a member selected from the group consisting of
(a) lower alkyl,
(b) phenyl,
(c) hydrogen,
(d) dialkylaminomethyl, and
(e) members of a radical wherein $R_5$ and $R_6$ together form a carbocyclic ring having four to eight carbon atoms;

at a temperature below the boiling point of the reaction mixture to produce a compound having the formula

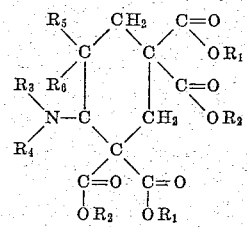

wherein $R_1$ through $R_6$ are defined as above.

7. A compound having the formula

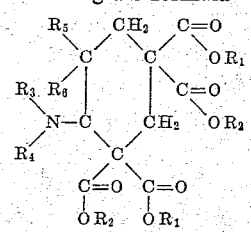

wherein each of $R_1$ and $R_2$ represents lower alkyl, each of $R_3$ and $R_4$ represents a member selected from the group consisting of lower alkyl, lower alkenyl, and members of a radical wherein $R_3$ and $R_4$ together with the nitrogen form a radical selected from the group consisting of pyrrolidino, piperidino, morpholino, and 3-azabicyclo-[3.2.2]nonyl, and $R_5$ and $R_6$ together are selected from the group consisting of
(a) two lower alkyl groups
(b) lower alkyl and hydrogen
(c) phenyl and hydrogen
(d) hydrogen and dialkylaminomethyl, and
(e) members of a radical wherein $R_5$ and $R_6$ together form a carbocyclic ring having four to eight carbon atoms.

No references cited.